_United States Patent_ [19]

Schild

[11] 4,125,330
[45] Nov. 14, 1978

[54] PHOTOMETRIC APPARATUS

[75] Inventor: Felix Schild, London, England

[73] Assignee: Electrical Instrumentation Co. Ltd., London, England

[21] Appl. No.: 639,771

[22] Filed: Dec. 11, 1975

[30] Foreign Application Priority Data

Mar. 11, 1975 [GB] United Kingdom ............... 45654/75

[51] Int. Cl.² .............................................. G01J 3/50
[52] U.S. Cl. .................................... 356/416; 250/226;
356/404; 356/223
[58] Field of Search ............... 356/173, 175, 185, 186,
356/188, 189, 195, 201, 204, 205, 212, 223, 225,
226, 97; 250/226; 355/38

[56] References Cited

U.S. PATENT DOCUMENTS

| 3,612,683 | 10/1971 | Riley et al. | 356/175 X |
| 3,765,778 | 10/1973 | Bey et al. | 356/175 X |
| 3,856,413 | 12/1974 | Bey et al. | 356/175 |
| 3,972,617 | 8/1976 | Shibata et al. | 356/97 X |

_Primary Examiner_—F. L. Evans
_Attorney, Agent, or Firm_—Mawhinney & Mawhinney & Connors

[57] ABSTRACT

Photometric apparatus for use as a color analyser or color temperature meter or graphic arts photometer has a logarithmic photometer, means for storing the analogue output of the photometer combined with a reference signal, and means for comparing the stored signal with a subsequent photometer output signal connected by a different reference signal. In a color analyser or color temperature meter switchable color filters are provided with automatic switching of the reference signals in accordance with the color section.

13 Claims, 4 Drawing Figures

PHOTOMETRIC APPARATUS

BACKGROUND OF THE INVENTION

This invention relates to photometric apparatus and finds particular application in electronic colour photometers, especially those constructed for use as colour analysers, colour temperature meters and graphic arts camera photometers.

In such instruments the range of intensity measurement required is commonly some four or more decades and the percentage accuracy is desirably constant. For this reason it is the common practice to construct such instruments to read logarithmic intensity increments on a linear scale and, for this reason, such a photometer is commonly termed a log photometer.

Log photometers can be constructed using, as a light sensor, a photomultiplier operated in the "constant anode current mode" or a photomultiplier operated at constant EHT with or without logarithmic conversion or by using other photo cells, for example selenium or silicon operating into an infinite impedance circuit. Such instruments are well known and will not be described further except in so far as it is necessary to explain their use in the apparatus of the present invention.

The present invention is concerned with the processing of information obtained by making certain measurements with the photometer and with ensuring that the results obtained are valid. It is convenient at this stage to consider more particularly the basic construction and use of a colour analyser. Such an instrument consists of a log photometer, usually having a photomultiplier sensor. Used with the sensor is a light source and a filter system having three switchable primary colour filters, each associated with a corresponding read-out zero setting control, and, in addition, an "open filter" (i.e. an aperture or filter transmitting white light) also with zero control. To use this instrument in the printing of a photographic negative, the instrument is first employed to assess a known negative in a photographic printing set-up which will yield a neutral balanced correctly exposed print. For this purpose, the photomultiplier is put into the exposing area or a selected part thereof in the printing set-up and, with the various filters successively put between the light source and the sensor, each zero control is in turn set so that the instrument read-out, which may be a galvanometer or digital volt meter or other form of indicator, indicates balance. When a production negative, that is a negative to be printed, is inserted into the printing set-up, it is then only necessary to adjust the primary colour light intensities to the levels set up in the colour analyser and then print the negative by exposing it for the same time as used for the reference negative in order to achieve a satisfactory print. In rudimentary instruments, the common practice is to use a lens iris as the means of adjustment of the total light. More advanced instruments incorporate an electrical control, frequently termed a "master control" or "electronic iris" which is used to compensate for overall density deviation of the production negative from the programmed reference to bring the read-out to balance point on one colour and to permit the operator to bring the remaining two colours back to balance by the use of filters. This master control must only operate on the colour channels.

It will be seen that the colour analyser is used essentially for comparing light intensities. A similar requirement arises in a colour temperature meter. As is well known, the spectral energy distribution, that is to say the relationship between energy and wavelength, differs for different light sources. As the colour temperature (that is the temperature of a perfectly radiating black body when emitting light matching the source under test) rises, the relative blue content increases and the red content decreases. Colour temperature measurement is essentially concerned therefore with the comparison of the red and blue content of a light source. A tricolour temperature meter has to measure the relative intensities of the red and blue components compared with the green.

A graphic arts camera photometer is used to evaluate the maximum and minimum densities of the copy to provide, for exposure control, information about the minimum density and the total density range.

SUMMARY OF THE INVENTION

All these forms of photometric apparatus are therefore concerned with the comparison of light intensities. It is an object of the present invention to provide an improved form of photometric apparatus facilitating the determination of comparative intensities from the output of a log photometer.

According to this invention, in photometric apparatus having a log photometer providing an output signal representative of the logarithm of the sensed light intensity, there are provided a memory circuit for holding a signal voltage, switch means for selectively connecting the memory circuit to the photometer output whereby the photometer output signal may be stored, a read-out including a summing amplifier and an indicator indicating the magnitude of the output of the summing amplifier, means for feeding the photometer output to said summing amplifier, and switchable means for applying the stored signal from the memory to said summing amplifier in opposition to the photometer input. Preferably a reference signal generator is also provided having selector switch means for selecting any one of a plurality of reference signals, at least some of which are adjustable, together with means for combining the selected reference signal with the photometer output before the photometer output is applied to said memory or said summing amplifier. For this purpose, said combining means may comprise a high gain amplifier with negative feedback and having a current input derived from the photometer output and said reference signal generator may comprise a voltage source with a plurality of selectable resistors, at least some of which are adjustable for providing any selected one of a number of reference signal inputs to the high gain amplifier which constitutes a further summing amplifier.

It will be seen that with this construction, the memory unit enables a signal representative of a light intensity to be stored so that the output indication on a subsequent reading can be obtained of the difference between a sensed light intensity and the stored value. The automatic determination of the difference between light intensities not only facilitates for example the measurement of a range of intensity as required in a graphic arts photometer but more particularly facilitates colour balancing in that it enables the user to adjust a light intensity by an appropriate filter so as to obtain a zero indication on the output indicator as an indication of the correct adjustment. This considerably simplifies the operation of a colour analyser and obviates the necessity of noting measurements and making calculations.

If a reference signal source is provided as described above, the memory device is arranged to store the photometer output combined with a selected signal from the reference signal source. In applying the invention for example to a colour analyser, the reference signal source may have selector means for selecting any one of four separate signals. In the setting up of the colour analyser, as described above, using a known negative, the reference signal source may be adjusted for each of the primary colours and with the "open filter" to give signals which balance the corresponding photometer output signals. Thus, for any other negative, balance on each primary colour and with the "open filter" would indicate correct colour balance and that the overall light intensity corresponds to that of the known negative. With the negative to be printed, the photometer may thus readily be used to determine the errors in colour balance. Conveniently, as described more fully later, the colour which indicates the greatest optical density is employed as a reference and the intensity ratio for the other two colours with respect to the reference colour can be compared with the intensity ratios for the known negative; for each of these colours, the necessary adjustment can then be effected by introducing a filter between the light source and photometer to bring the indicator to zero thereby determining the filters required for correct printing.

The invention includes within its scope a colour analyser comprising a logarithmic photometer with selector means for selecting three primary colour filters and an "open filter", an output indicator including a summing amplifier, a further signal combining amplifier with four selectable inputs from adjustable reference signal sources, said further amplifier being arranged for summing the selected reference signal source with the photometer output, means for applying the output of said further signal combining amplifier to the input of said first summing amplifier, a voltage store, a first switch means operable to connect the output of said further amplifier to said store, and a second switch means operable to connect the store output to the summing amplifier in opposition to the output from said further amplifier, whereby a stored signal obtained on sensing with one colour filter can be compared with the output from the photosensor, connected by an appropriate signal from the reference signal source, using another colour filter.

The first switch means conveniently comprises a normally-open electronic switch closable by application of a switch control signal and there may be provided means for producing said control signal and applying to said electronic switch comprising a manually-operable normally-open switch, a voltage source and a first four-position selector switch ganged to the filter selector means, the voltage source being connected to said first selector switch to feed an output to said manually-operable switch when a colour filter is selected whereby the first switch is closed when the manually-operable switch is operated provided the selector means is set to select a colour filter.

The selector switch enables the user to select the particular colour on which the error sensing memory updating is to be effected. The manually-operable switch ensures that memory updating can only take place when the photo-sensor is fully exposed to light and inhibited when filter change commences.

It is not essential however to select one particular colour for setting a signal into the store. It is possible to choose some maximum or minimum value, e.g. using a circuit based on a diode or a diode with an amplifier.

The second switch is also preferably an electronic switch controlled by selector means so that it can only be operated when a colour filter is selected.

The photometer might be exposed to insufficient light to give a valid reading. Preferably therefore means are provided for comparing the photometer output with an adjustable reference signal and giving an output when the photometer output indicates a light level below that corresponding to the reference signal. This output may be used to operate an indicator, e.g. a signal lamp. A further warning circuit may be provided to indicate if the light level exceeds some maximum level by using a further comparator and adjustable reference signal.

A tricolour colour temperature meter has to measure the relative intensities of the primary components. In using the apparatus of the present invention for this purpose, the photometer is fitted with the three primary colour filters as before. The output indicator may be calibrated in terms of apparent relative colour temperature of the red and blue components relative to the green. The store may be updated on the green and readings taken on the red and blue give the colour temperature of the light source directly, regardless of its intensity.

A graphic arts camera photometer is used to evaluate the maximum and minimum densities of the copy. The information which is required for exposure control however is the minimum density and the total range. By using the present invention, it is possible to read the two density values but also to directly read their difference. This is done by actuating the memory store switch, which charges the memory capacitor to the value corresponding to the density while reading the minimum density area patch. The maximum density area patch is next read, noted, and a further switch is closed which connects the buffered and inverted memory output to the summing junction of the read-put amplifier, the result of which is to read out the density difference.

DESCRIPTION OF THE PREFERRED EMBODIMENTS

Figure 1:
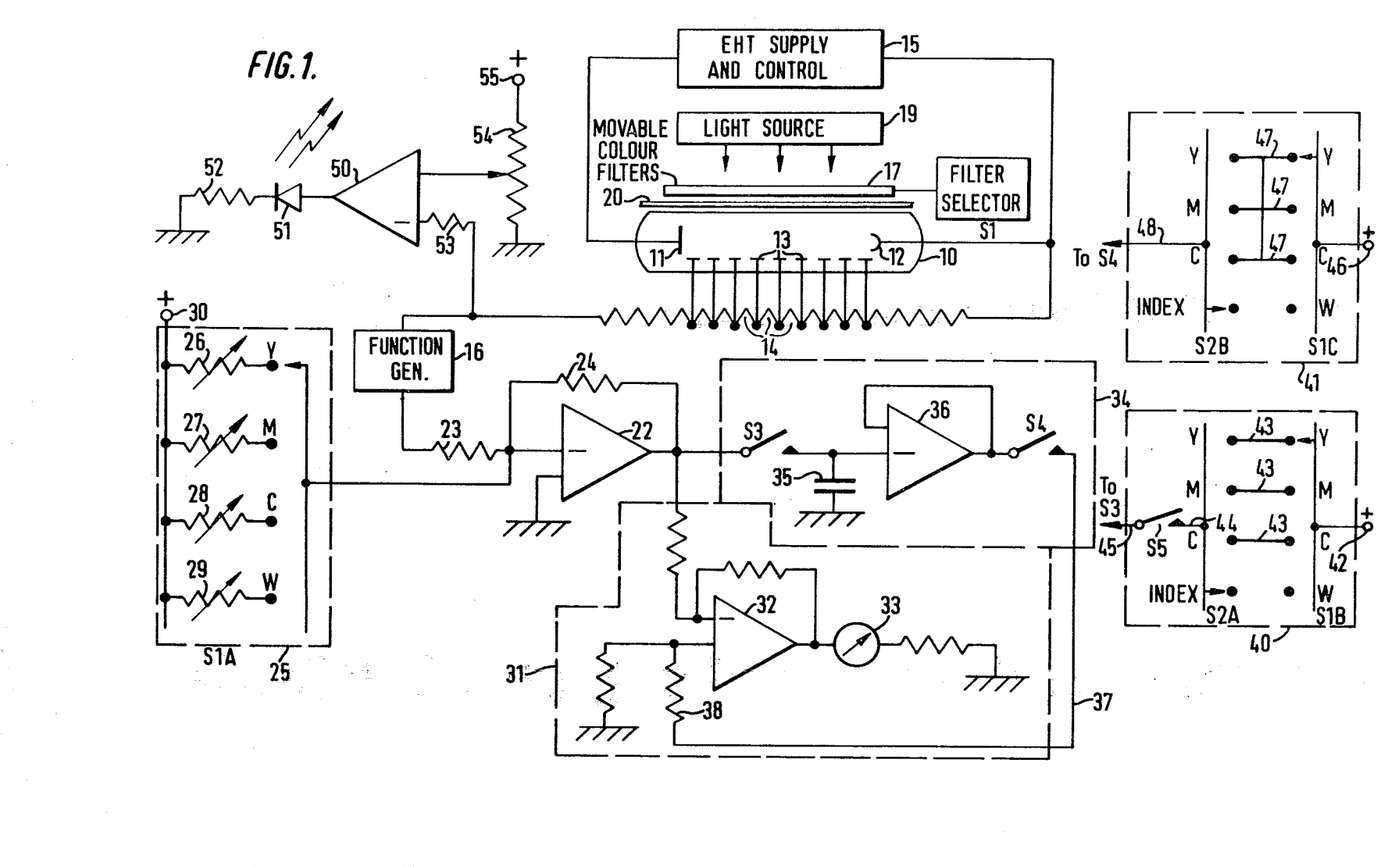
FIG. 1 shows diagrammatically the circuit arrangement of a colour analyser.

Referring to FIG. 1, the colour analyser illustrated therein has a photomultiplier tube 10 with an anode 11, cathode 12 and dynodes 13 which are connected to a bleeder resistor chain. An EHT supply unit 15 includes, in the known way, a control unit arranged for "constant anode current" operation of the photomultiplier tube so that the dynode voltage per stage will change with changes of incident radiation on the tube in a manner such that the change in this voltage is nearly proportional to changes in the logarithm of the light intensity. The dynode voltage is obtained from the EHT supply so that the dynode voltage is proportional to the EHT voltage between the anode 11 and cathode 12. The current through the bleeder chain is thus representative of the incident radiation. For many purposes, it is desirable to have an output display measuring in terms of optical density, that is the logarithm of the reciprocal of the transmissivity, in other words the output scale should be linearly related to the logarithm of the measured radiation. A function generator 16 is connected between the bleeder chain 14 and the output circuit (to be described later) to improve the linearity of the relationship between density and EHT. A logarithmic photo-sensor, as thus far described, is known in itself and it will not therefore be further described in the present specification.

In this colour analyser, a set of movable colour filters 17 are selectively controlled by a filter selector 18, referred to hereinafter as the S1 selector, so that any selected one of the filters can be positioned between the photomultiplier tube 10 and a light source indicated diagrammatically at 19. The colour analyser is used in a photographic printing set-up, e.g. an enlarger. A colour negative 20 or other transparency to be printed is set set-up in the colour enlarger which includes the light source 19 and also a further set of filters (not shown) used in printing. The S1 selector is mechanically coupled to three multi-position electrical selector switches S1A, S1B and S1C, each having four positions. The S1 selector enables filters of any one of the three primary colours, red, green and blue, to be selected; the fourth position is an "open" filter, that is to say a position in which all colours of light are passed. The S1A, S1B and S1C switches each have four positions corresponding to the four filter positions.

The linearised output from function generator 16 is fed to signal combining means which, in this embodiment is a summing amplifier 22. This amplifier is a high gain amplifier with an input resistor 23 through which the signal from the photometer is fed to give a current input. The amplifier has a feedback resistor 24 and compares the signal from the function generator 16 with a reference signal from a reference signal unit 25. This unit 25 comprises four resistors 26, 27, 28 and 29; in this particular embodiment, all four resistors 26, 27, 28 and 29 are adjustable. One end of each of the resistors 26-29 is connected to a reference voltage source indicated by terminal 30. The aforementioned selector switch S1A enables the other end of any selected one of the four resistors 26-29 to be connected to the input of amplifier 22 to provide a current input to be summed with the current input derived from function generator 16 through resistor 23. Although unit 25 has been illustrated as having adjustable series resistors to provide adjustable current inputs, it is obviously possible to use adjustable potentiometers and a fixed series resistor for this purpose.

The output of the summing amplifier 22 is fed to an indicator or read-out unit 31 which includes a differential amplifier 32 and an output indicator 33 for indicating the current output of amplifier 32. The amplifier 32 compares the signal from amplifier 22 with a memory signal from a memory unit 34. This memory unit includes an input switch S3, an output switch S4 and, between the two switches, a capacitor 35 forming a voltage store, and an inverting and isolating buffer amplifier 36. When the switch S3 is closed, the voltage output from the amplifier 22 is applied to the capacitor 35 which is thereby charged to the potential corresponding to the difference between the input signals from resistor 23 and reference signal unit 25. The buffer amplifier 36 enables this voltage, when required, to be fed via a lead 37 and input resistor 38 to the amplifier 32.

Since amplifier 36 is an inverter, this signal is in opposition to the aforementioned input to amplifier 32 from summing amplifier 22.

The switches S3 and S4 are voltage-operated switches. The memory capacitor 35 has to be a low-leakage component of low hysteresis. The switch S3 should have good insulation and conveniently is a C-MOS switch. The amplifier 36 needs to have a high input impedance and low offset current and leakage current. Sample and hold circuits are commercially available however meeting these requirements.

Operation of the switch S3 is controlled by a switch control unit 40 and operation of switch S4 by a switch control unit 41. Switch control unit 40 contains the aforementioned four position switch S1B, a second four position switch S2A and a manually operable push-button switch S5. As will be seen from FIG. 1, when the switch S1B is in any one of the three positions marked Y, M and C, a positive potential from a supply source 42 is applied to a respective one of three links 43 leading to contacts on the S2A switch. If the switch S2A is in the corresponding Y, M or C position as the S1B switch, then the voltage from source 42 is applied to a lead 44 and thence via the manually operable switch S5 to a lead 45 for applying a control signal to operate S3. The switch unit 41 contains the aforementioned four position switch S1C which applies a positive voltage from a positive potential supply source 46 to three links 47 which, in unit 41, are coupled together so that, if the S1C switch is in any one of the positions Y, M and C and switch S2B is in any one of the positions Y, M and C, a potential is applied to an output lead 48 for operating the switch S4. For both switch units 40 and 41, if the S1 switch is in the W position or switch S2 in the "index" position, no potential is applied to operate switches S3 and S4. These switches are normally open and are closed on application of the supply voltage.

The apparatus of FIG. 1, when used for colour analysis in photographic printing, is set up initially using a known negative by putting a photomultiplier tube to receive light in the exposing area, or a selected part thereof, in a photographic printing set-up which will yield a neutral balance and correctly exposed print with the known negative. Here it may briefly be explained that with present-day colour photographic techniques which make use of subtractive systems of colour photography, the recording of this subject is effected in terms of the three primary colours, blue, green and red but the printing of the final picture is effected using positive-dye images in the complementary colours, yellow, magenta and cyan. Because the user is primarily concerned with the printing, it is convenient to refer to the control position by reference to the complementary colours and it is, for this reason, that the positions of the switches are referred to using the names of the complementary colours, yellow, magenta and cyan and are indicated in the drawings with the initials Y, M and C respectively.

With switch S2 in the index position, as marked on FIG. 1, so that contacts S3 and S4 are open, the switch S1 is adjusted so that the open filter is first selected. Switch units S1A, S1B and S1C are thus in the W position. A lens iris on the light source is adjusted to set the total light to bring the meter to balance. Each of the red, green and blue filters in turn is selected by the filter selector switch S1 and the controls for the respective potentiometers 29, 28, 27 and 26, selected by S1A in reference unit 25 are adjusted to give balance on the indicator 33. These controls are thus now set to give the necessary reference values. The apparatus can then be used, for example, for controlling the printing of an unknown negative in the following manner: With switches S2A and S2B in the index position so that switches S3 and S4 are open, the switch S1 is operated to the positions Y, M and C and the colour which has the highest density is noted. Switches S2 and S1 are then switched to that colour. When the switches S2 and S1 have been switched to the colour which has the highest density, circuits are made through the switch units 40, 41 to operate the S3 and S4 switches so that, on operation of switch S5 which is momentarily pressed, the switches S3 and S4 are closed. S3 is closed only while S5 is pressed but S4 remains closed. The switch S5 is manually operated after selection of the switches S2 and S1 so that the switch S4 is not closed until after the capacitor 35 has been charged to the appropriate voltage. The capacitor 35 is thus charged to a potential corresponding to the density difference sensed as the difference between the output of the photomultiplier tube 10 applied via function generator 16 to the summing amplifier 22 and the reference potential difference obtained from reference unit 25. This difference potential, stored in the capacitor 35, is buffered by amplifier 36, and applied via switch S4 to the differential amplifier 32. The meter 33 will indicate zero because the stored signal is, in this switch position, equal to the other input to amplifier 32. The switch S1 is now switched to one of the other colours without altering S2. Because of switch unit 40, switch S3 will remain open preventing any change in the voltage stored in the memory. Switch S4 however remains closed because of the interconnection between the links 47 in switch unit 41 and the indicator 33 will now display a nett density by summing signals comprising the photometer output using the colour filter to which the switch S1 has now been set, the reference signal from unit 25 for that colour and the stored signal from amplifier 36 which corresponds to the density using the colour which has the highest density. The light intensity in the now selected colour may be adjusted in the known way by means of a complementary filter to bring the read-out to balance point. By returning the filter selection switch S1 to the reference colour, the potential stored on capacitor 35 may be updated to take into account any filter cross-talk and by then returning to the selected colour, a secondary order adjustment may be effected. The third colour may then be balanced in a similar way. Then the S1 selector is switched to the total light position; in this position switch contacts S1A, S1B and S1C will be in the W position and the measurement indicated on meter 33, being the photometer output relative to the preset value as determined by resistor 29, represents the exposure adjustment required. This may be used as a direct multiplier of the original exposure or the total light may be adjusted to be identical with that originally projected by the reference negative for example using the lens iris in the light source. If the lens iris is adjusted, the exposure time may be maintained constant.

It will be seen that the apparatus shown in FIG. 1 enables selection of appropriate filters in the printing apparatus to be effected to obtain colour balance and enables the total light or exposure time to be adjusted as required.

In the particular mode of operation described, the operator selects the particular colour to be used for obtaining the zero balance by choosing that colour for which the sensor indicates maximum density. It is not essential to operate in this way and it would be possible for example to use a maximum or minimum value selector circuit for example making use of a diode or a diode with an amplifier and then to use filters for each of the three colours in turn to bring the arrangement to balance.

As will be seen from FIG. 1, the output from the dynode bleed resistor chain is also fed to an amplifier 50 which drives a light-emitting diode 51 in series with a current limiting resistor 52. The input from the photosensor is applied via a resistor 53 to an inverting input terminal of amplifier 50 which has a non-inverting input terminal connected to a tap on a potentiometer 54 connected to a stable reference voltage source 55. When the signal sensed from the dynode bleed resistor chain exceeds the value selected by the potentiometer 54, the diode 51 lights up. The potentiometer 54 is set in accordance with the maximum density which is to be used. Thus lighting up of diode 51 warns the user to disregard the reading and to increase the light in order to effect a valid colour balance.

Figure 2:
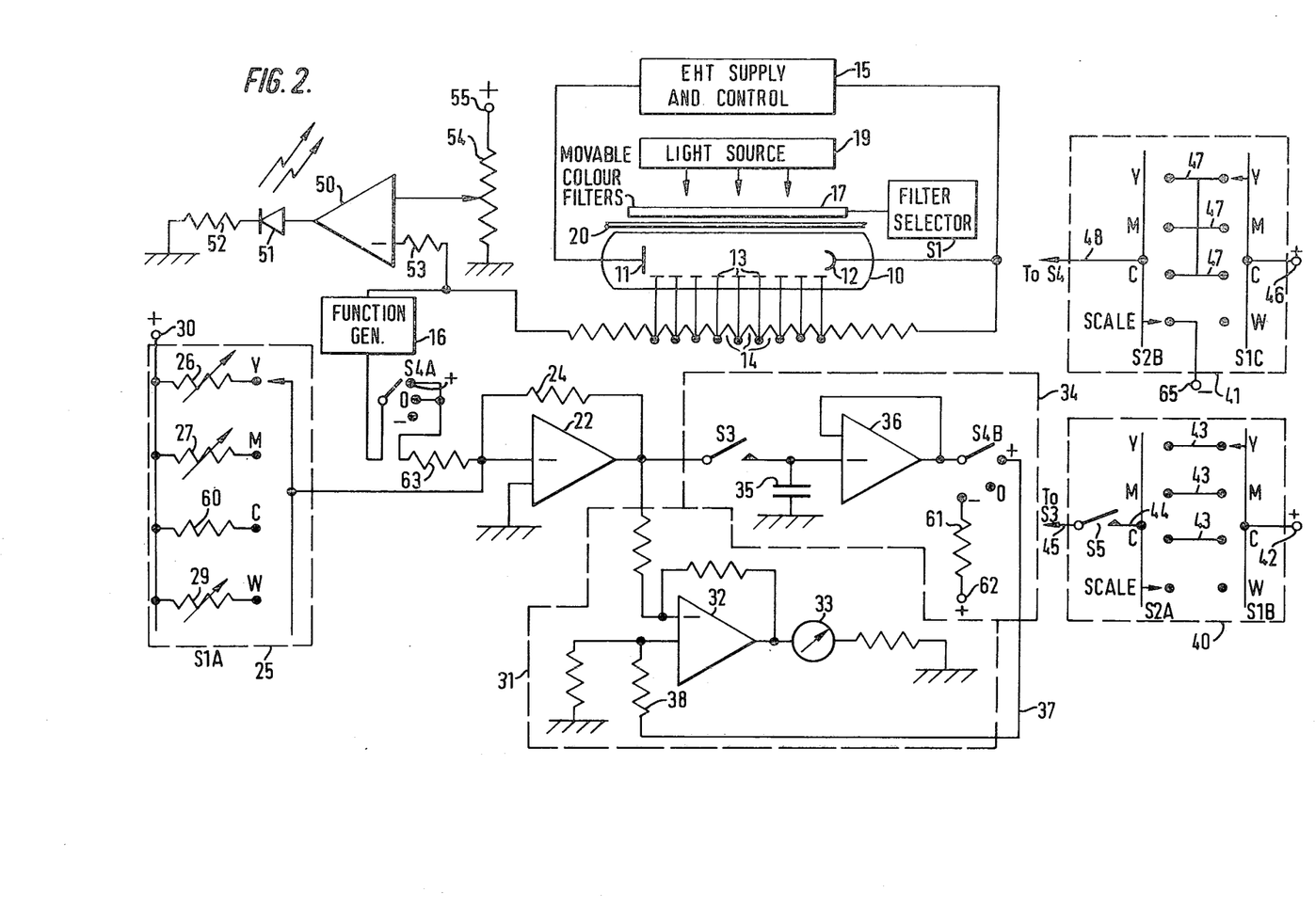
FIG. 2 shows a modification of the colour analyser of FIG. 1.

FIG. 2 illustrates a modification of the apparatus of FIG. 1 and the same reference characters are used to indicate corresponding components. In the following description, reference will only be made to the distinctive features of the arrangement of FIG. 2. In this embodiment, the cyan zero control in reference signal unit 25 is a fixed resistor 60 instead of being the adjustable resistor 28 as in FIG. 1. The switch S4 is a three position switch having two sets of contacts marked S4A and S4B, each having three positions marked +, 0 and −. Contacts S4B in the central position indicated as 0 correspond to the open position of contacts S4 in FIG. 1 and in their top position marked as + correspond to the closed position of contacts S4 of FIG. 1. There is a third position marked − however of contacts S4B in which the output of the amplifier 36 is connected by a resistor 61 to a positive voltage source 62. The contacts S4A are in the input circuit to the amplifier 22 between the function generator 16 and the input resistor 63. In the first (+) and second (0) position, contacts S4A are closed whilst in the third (−) position the circuit is open.

Referring to the switch control units 40 and 41, it will be noted that the lowest positions of the switches S2A and S2B are marked "scale" instead of "index" and that switch S2B, when in the scale position, serves to apply a negative voltage from a source 65 to the switch S4 to take the contacts S4A and S4B to the − position.

The apparatus of FIG. 2 is operated generally in the manner of the apparatus of FIG. 1 except that, in the indexing stage, switch S2 is set to cyan to obtain the required charge in the memory for the subsequent operations. The yellow, magenta and white positions are then indexed in turn as before. When S2 is moved into the fourth (index) position, the negative voltage is applied to S4A and S4B and thus the photometer is disconnected from the summing amplifier 22 by switch S4A and, instead, a fixed value current is fed into the amplifier 36 from the aforementioned source 65. It is thus now possible to read out the magnitudes set in by the potentiometers 26, 27 and 29 and fixed resistor 28, in the reference signal unit by operation of the selector switch S1A.

The apparatus of FIG. 1 may be used as a colour temperature meter. As is well-known, the spectral energy distribution, that is to say the relationship between energy and wavelength, differs for different light sources. With practical light sources, as the colour temperature rises (that is the temperature of a perfectly radiating black body when emitting light matching the source under test), the relative blue content increases and the red content decreases. Colour temperature may therefore be measured by comparative readings of the red and blue content of the light source. In the apparatus of the present invention, colour temperature is determined by comparing the light intensity of each of the red and blue components of the light source separately with the green component. It will be readily apparent how this may be done with the apparatus of FIG. 1. The green filter is selected by filter selector S1, the apparatus is balanced and the output signal is stored in capacitor 35. The intensities of the light source viewed through the blue and red filters can then be observed and each is indicated in turn on meter 33 which, by the summing with the inverted signal from the memory unit gives a correction for the green intensity. The meter 33 can thus be calibrated in terms of the apparent relative colour temperature of the red and blue components relative to the green. The memory ensures that the reading is correct regardless of the intensity of the light source. For the use of the instrument as a colour temperature meter, the potentiometers in the reference signal unit 25 would be pre-set adjustments set in initially calibrating the apparatus in the factory and the controls for these potentiometers would not be made accessible for the user to adjust.

Figure 3:
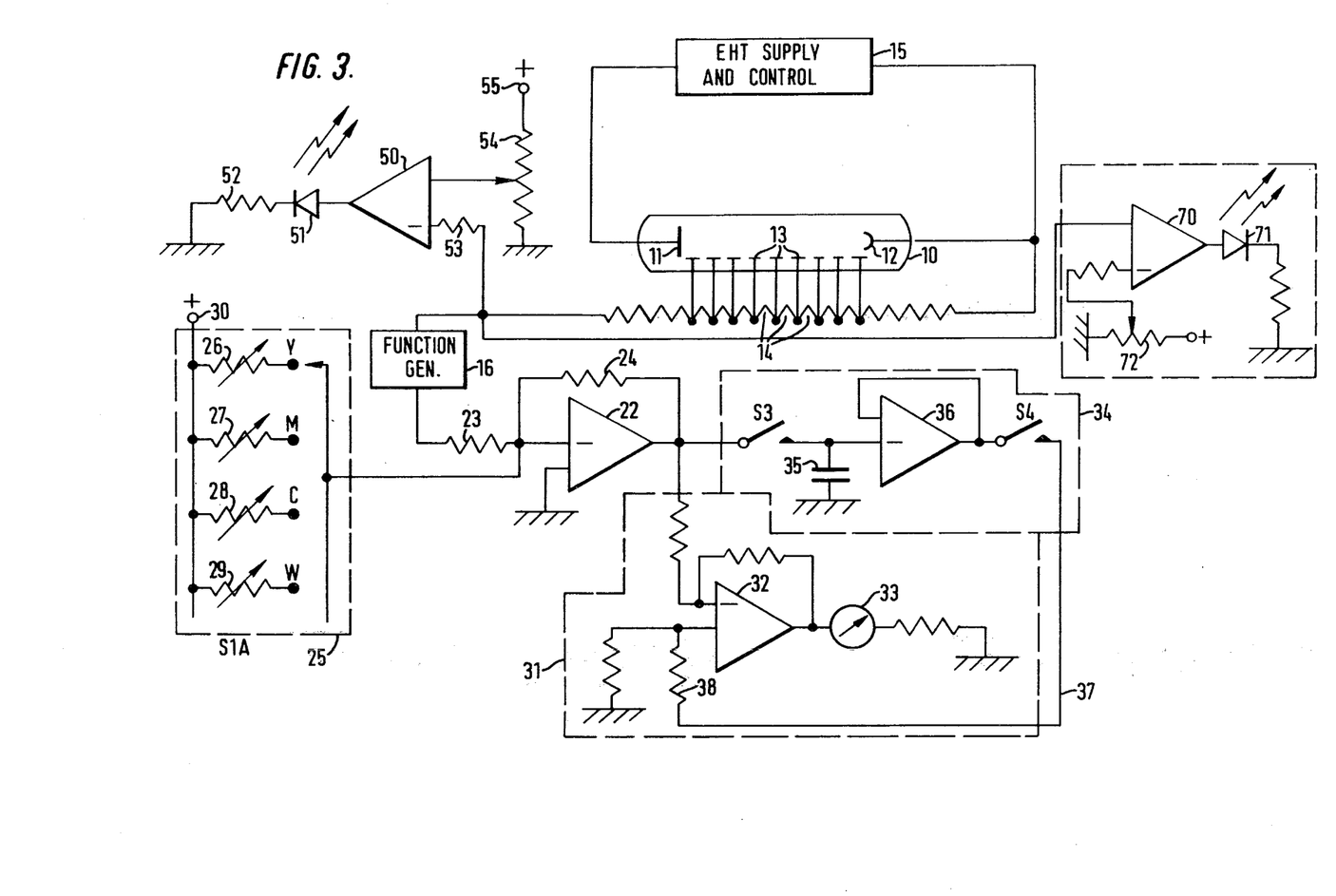
FIG. 3 shows diagrammatically the circuit arrangement of a graphic arts photometer.

FIG. 3 illustrates a form of graphic arts photometer constructed to read the minimum density of copy and then to memorise this value to enable a reading to be made of the difference between the memorised value and the maximum density of the copy. In FIG. 3, the same reference numerals are used as in FIG. 1 to illustrate corresponding components and reference will be made only to the distinctive features. For a graphic arts photometer, the colour filters 17 are omitted and hence the selector switch S1 with its banks of contacts S1C and S1B can be omitted. The switch S1A however is retained with the reference signal unit 25, the various resistors 26, 27, 28 and 29 being used to set in signals corresponding to different batches of sensitive materials. The photometer is balanced on a reference copy projection in the minimum density area. With the unknown copy, the minimum density is selected, the reading taken and the switch S3 closed to memorise this reading and then opened again. The maximum density area is then selected and the value relative to the standard can then be read on the meter 33. By closing switch S4, the memorised value is fed into the amplifier 32 and hence the range can be read off directly on the meter 33. In the graphic arts photometer of FIG. 3, it is useful to have not only the low light level warning 50–54 but to provide also another out-of-range light level indicator to indicate a maximum or excess light level so as to prevent invalid readings being accepted. For this purpose there is provided a further operational amplifier 70 and light emitting diode 71 with a level setting potentiometer 72 arranged so as to indicate when the light level exceeds some predetermined value set in by the potentiometer 72.

Figure 4:
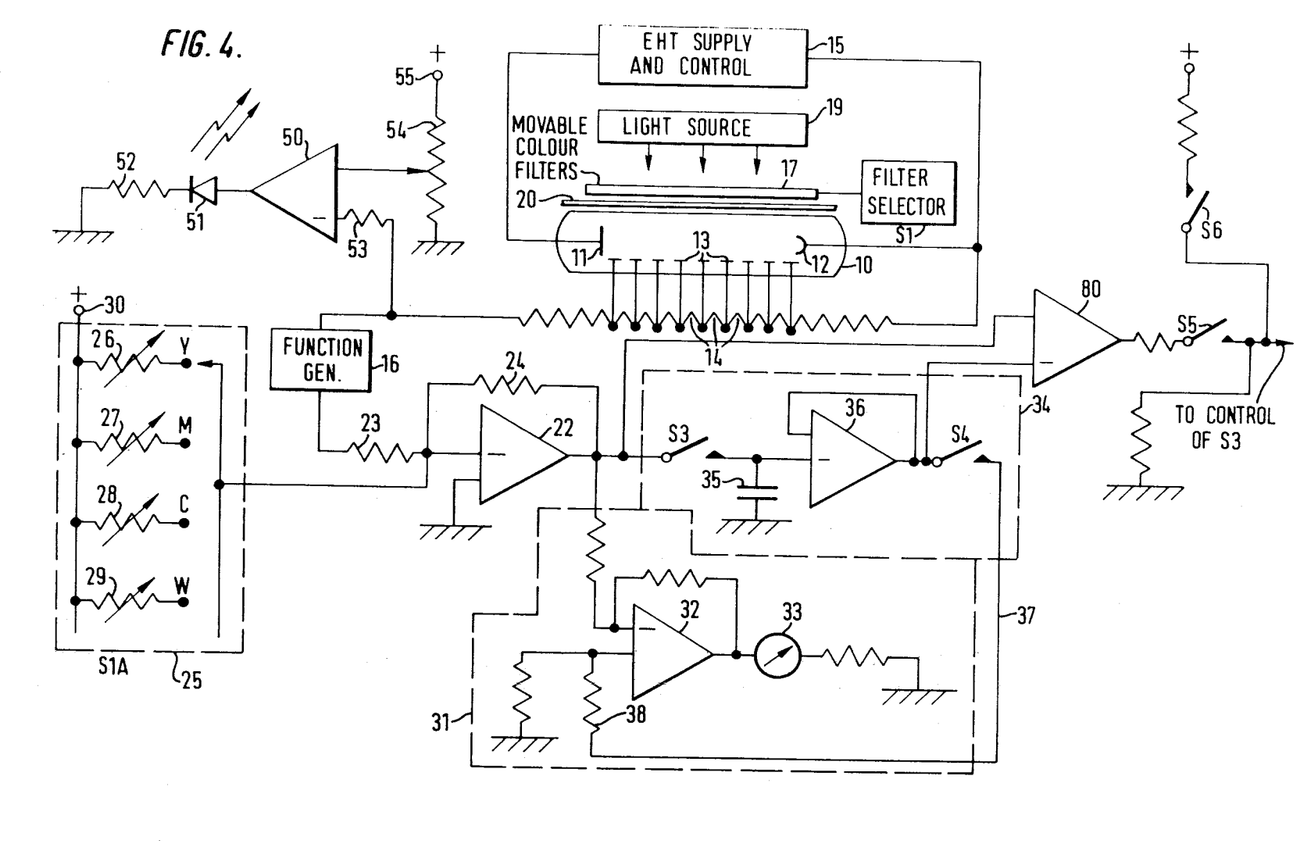
FIG. 4 shows a further modification of the colour analyser of FIG. 1 or FIG. 2.

FIG. 4 illustrates a further modification of the apparatus of FIG. 1 in which the memory updating is effected by automatic selection of the updating colour channel. In FIG. 4, there is provided a further amplifier 80 which senses the output of the amplifier 22 and compares this with the output of the buffer amplifier 36. When the output of amplifier 22 exceeds the output of the amplifier 36, the resultant signal from amplifier 80 is fed via switch S5 to control the switch S3 so that the latter is closed. S3 in this case conveniently is an MOS switch. The switch unit 41 comprising switch banks S1C and S2B is provided to control S4 and an additional switch bank (not shown) may be provided ganged with S1 and arranged to inhibit updating in the white position. If the read-out meter 33 should, during the operation, show excess density because the stored signal in the memory unit 34 does not represent the maximum density colour, a cancel switch S6 may be operated momentarily to re-establish zero by closing S3 so that the capacitor 35 is charged to the value of the newly-found maximum density. This switch S6 is a manual switch which is also used to re-establish zero when a new negative is inserted in the apparatus.

In the description of the operation of the apparatus, reference has been made more particularly to colour analysis and printing in a negative/positive process. The apparatus can equally well be employed in reversal printing from transparency except in that, as regards exposure, the density differences have then to be interpreted into the inverse sense, i.e. the denser the transparency position, the shorter the required exposure.

I claim:

1. Photometric apparatus having a log photometer providing an output signal representative of the logarithm of a sensed light intensity wherein there are provided a memory circuit for holding a signal voltage, switch means for selectively connecting the memory circuit to the photometer output whereby the photometer output signal may be stored, a read-out including a summing amplifier and an indicator indicating the magnitude of the output of the summing amplifier, means for feeding the photometer output to said summing amplifier, and switchable means for applying the stored signal from the memory to said summing amplifier in opposition to the photometer output and wherein a reference signal generator is provided having selector switch means for selecting any one of a plurality of reference signals, at least some of which are adjustable, and means for combining the selected reference signal with the photometer output before the photometer output is applied to said memory or said summing amplifier.

2. Photometric apparatus as claimed in claim 1 wherein said combining means comprises a high gain amplifier with negative feedback and having a current input derived from the photometer output and wherein said reference signal generator comprises a voltage source with a plurality of selectable resistors, at least some of which are adjustable.

3. In a colour analyser, the combination, with a logarithmic photometer providing a photometer output, of selector means for selecting three primary colour filters and an "open filter", an output indicator including a first summing amplifier, four adjustable reference signal sources, selector means for selecting any one of said reference signal sources to provide a selected reference signal, a further signal combining amplifier, means for applying the selected reference signal to said further amplifier, means for applying the photometer output to said further amplifier, means for applying the output of said further amplifier to the input of said first summing amplifier, a voltage store, a first switch means operable to connect the output of said further amplifier to said store, and a second switch means operable to connect the store output to the first summing amplifier in opposition to the output from said further amplifier, so that the output of said first summing amplifier obtained on sensing with one color filter is representative of the difference between the photometer output, corrected by an apppropriate selected reference signal, and a stored, previously determined, photometer output measured using another color filter and also corrected by an appropriate selected reference signal.

4. The combination as claimed in claim 3 wherein the selector means for selecting any one of the reference signal sources is ganged with the filter selector means.

5. The combination as claimed in claim 4 wherein said first switch means comprises a normally-open electronic switch closable by application of a switch control signal and wherein there are provided means for producing said control signal and applying it to said electronic switch comprising a manually-operable normally-open switch, a voltage source, and a first four-position selector switch ganged to the filter selector means, the voltage source being connected to said first selector switch to feed an output to said manually-operable switch when a colour filter is selected whereby the first switch is closed when the manually-operable switch is operated provided the selector means is set to select a colour filter.

6. The combination as claimed in claim 5 wherein said means for providing a control signal and applying it to said electronic switch further comprises a second four-position selector switch connected to select any one of the four outputs of the first selector switch and to apply that selected output to the manually-operable switch only when the first selector switch is in a position corresponding to a colour filter and the second selector switch is in a corresponding position.

7. The combination as claimed in claim 6 wherein said second switch comprises an electronic switch operable by a second switch control signal to a switch control input and wherein there are provided a second bank of contacts on said second selector switch, a further bank of contacts on said first selector switch and a voltage source, the second bank and the further bank being interconnected between the voltage source and the switch control input so that a voltage from said source is applied as said control signal to said second switch when the filter selector is set to select any of the colour filters and wherein the second selector switch is set into any of the three positions corresponding to colour filters.

8. The combination as claimed in claim 4 wherein the first switch comprises a normally-open electronic switch operable by a first switch control signal and wherein there is provided a comparator arranged to compare the signal in the store with the output of said further amplifier to produce a signal output when the output of the further amplifier to produce a signal output when the output of the further amplifier is greater than the stored signal, and there is also provided a normally-open manually-operable switch connected between said comparator and said electronic switch for controlling the application of said comparator output to said electronic switch as said switch control signal.

9. The combination as claimed in claim 3 wherein said voltage store comprises a high gain amplifier having an input, an output and a low impedance feedback and a capacitor having one pole connected to the input of said high gain amplifier.

10. The combination as claimed in claim 9 wherein said second switch comprises a three-position switch with two banks of contacts, one bank of contacts being arranged to connect the output of the high gain amplifier in the first switch position to said summing amplifier, being arranged in the second switch position to disconnect the high gain amplifier output from the summing amplifier and wherein there is provided a further voltage source with a series resistor, the said one bank of contacts being arranged, in the third switch position, to connect the further voltage source and series resistor to the output of said high gain amplifier and wherein said second bank of contacts are arranged, in the first and second switch positions, to connect the output of the logarithmic photometer to the input of said high gain amplifier.

11. The combination as claimed in claim 3 wherein the logarithmic photometer comprises a photomultiplier tube.

12. Photometric apparatus having a log photometer providing an output signal representative of the logarithm of a sensed light intensity wherein there are provided a memory circuit for holding a signal voltage, switch means for selectively connecting the memory circuit to the photometer output whereby the photometer output signal may be stored, a read-out including a summing amplifier and an indicator indicating the magnitude of the output of the summing amplifier, means for feeding the photometer output to said summing amplifier, switchable means for applying the stored signal from the memory to said summing amplifier in opposition to the photometer output, and an indicator, including a comparator and adjustable comparison signal source, connected to the photometer to indicate when the light falling on the photometer is less than an amount corresponding to the setting of said adjustable comparison signal source.

13. Photometric apparatus as claimed in claim 12 and having a further indicator including a further comparator and further adjustable comparison signal source, connected to the photometer to indicate when the light falling on the photometer exceeds an amount corresponding to the setting of said further adjustable signal source.

* * * * *